(12) United States Patent
Yamada et al.

(10) Patent No.: US 7,843,956 B2
(45) Date of Patent: Nov. 30, 2010

(54) WIRELESS SYSTEM, WIRELESS COMMUNICATION APPARATUS AND COMMUNICATION METHOD

(75) Inventors: Akira Yamada, Yokohama (JP); Kengo Yagyu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 775 days.

(21) Appl. No.: 11/834,978

(22) Filed: Aug. 7, 2007

(65) Prior Publication Data

US 2008/0037510 A1    Feb. 14, 2008

(30) Foreign Application Priority Data

Aug. 9, 2006    (JP) .............................. 2006-217290

(51) Int. Cl.
*H04L 12/413* (2006.01)
(52) U.S. Cl. ...................................... 370/447; 370/252
(58) Field of Classification Search ................. 370/230, 370/230.1, 231–232, 235, 237–238, 252, 370/445, 447–448, 461–462, 508, 516–517, 370/519

See application file for complete search history.

(56) References Cited

U.S. PATENT DOCUMENTS

| | | | | |
|---|---|---|---|---|
| 5,592,483 | A * | 1/1997 | Hieda et al. .................. | 370/445 |
| 6,078,568 | A * | 6/2000 | Wright et al. ................ | 370/312 |
| 6,680,950 | B1 * | 1/2004 | Nagata et al. ................ | 370/461 |
| 7,027,462 | B2 * | 4/2006 | Benveniste .................. | 370/447 |
| 7,424,029 | B1 * | 9/2008 | Shum .......................... | 370/445 |
| 2006/0039281 | A1 * | 2/2006 | Benveniste .................. | 370/230 |
| 2006/0057968 | A1 | 3/2006 | Ohtani | |
| 2007/0076741 | A1 * | 4/2007 | Lee et al. ..................... | 370/445 |
| 2007/0116033 | A1 * | 5/2007 | Reunamaki et al. .......... | 370/445 |
| 2007/0183326 | A1 * | 8/2007 | Igarashi et al. ............... | 370/230 |
| 2010/0110888 | A1 * | 5/2010 | Park et al. .................... | 370/230 |

FOREIGN PATENT DOCUMENTS

EP    1 505 775 A2    2/2005

OTHER PUBLICATIONS

"Wireless LAN Medium Access Control (MAC) and Physical Layer (PHY) Specifications", ANSI/IEEE Std 802.11, Local and Metropolitan Area Networks: Wireless LAN, Aug. 20, 1999, pp. 70-97.

(Continued)

*Primary Examiner*—Chi H. Pham
*Assistant Examiner*—Kevin Mew
(74) *Attorney, Agent, or Firm*—Oblon, Spivak, McClelland, Maier & Neustadt, L.L.P.

(57) ABSTRACT

A wireless communication system complying with a CSMA scheme includes one or more wireless communication apparatuses and a communication terminal that performs communication via the one or more wireless communication apparatuses. Each wireless communication apparatus includes: a transmission buffer configured to store a packet and output the packet according to transmission timing; a unit configured to determine a permissible delay time based on required quality for communication; and a control unit configured to determine the transmission timing, wherein, the control unit determines the transmission timing such that, after receiving a first packet, the wireless communication apparatus transmits the first packet after elapse of a waiting time that includes a period derived from a random number and the permissible delay time, and after receiving a response packet for the first packet, the wireless communication apparatus transmits a following second packet after elapse of a fixed period.

10 Claims, 10 Drawing Sheets

OTHER PUBLICATIONS

"Amendment 8: Medium Access Control (MAC) Quality of Service Enhancements", IEEE Std 802.11e-2005, Local and Metropolitan Area Networks, Nov. 11, 2005, pp. 70-108.

Stefan Mangold, et al., "IEEE 802.11e Wireless LAN for Quality of Service", Internet Citation, [Online], XP-002251598, Feb. 2002, pp. 1-8.

* cited by examiner

WIRELESS SYSTEM, WIRELESS COMMUNICATION APPARATUS AND COMMUNICATION METHOD

BACKGROUND OF THE INVENTION

1. Field of the Invention

The present invention relates to a wireless communication system, a wireless communication apparatus and a communication method for performing mesh type communications using a CSMA (Carrie Sense Multiple Access) scheme.

2. Description of the Related Art

A terminal conforming to the CSMA scheme performs virtual carrier sense for a random period before transmitting a packet, and actually transmits a packet after recognizing that another terminal does not communicate with a base station. When another terminal is communicating with the base station, the packet is transmitted after the communication completes. At this time, every terminal fairly has a transmission right. In the scheme called virtual carrier sense, backoff control is performed after a channel becomes idle only for an IFS (Inter Frame Space) period.

In the backoff control, after the channel becomes idle, a random number is generated within a prescribed CW (Contention Window) range so that the random period is determined according to the random number. Then, the random number is determined as an initial value so that the initial value is decreased as time elapses. When the number becomes 0, the packet is actually transmitted. The IFS is defined in the wireless LAN standard IEEE 802.11, and is a period during which idle detection is performed before transmitting a packet. CW is a maximum value of the random number that can be taken for backoff, and is a parameter necessary for realizing user multiplication.

In IEEE 802.11, a minimum value CWmin and a maximum value CW max for the CW are defined. For backoff control in the initial transmission, the random number is calculated using CWmin so that the value of CW is doubled each time when retransmission is performed. By the way, CWmax is an upper limit value of CW. According to the backoff control using randomness, it becomes possible that a plurality of terminals perform communication by sharing a same channel. But, according to this scheme, there is a possibility that a plurality of terminals may transmit a packet at the same time. In such a case, packet collision occurs so that the packet cannot be received correctly. As a result, communication quality is deteriorated.

For handling this problem, priority control is performed in a communication scheme described in the following non-patent document 1.

[Non-patent document 1] IEEE Std 802.11e-2005, Amendment 8: Medium Access Control (MAC) Quality of Service Enhancements (IEEE 802.11e), 11, Nov. 2005

EDCA (Enhanced Distributed Channel Access) is defined in IEEE 802.11e. In EDCA, four types of priorities are prepared for packets, and, a transmission waiting time such as the IFS, CWmin and CWmax is set to be short for a packet having high priority so that a packet transmission right is provided for the packet preferentially. Accordingly, in an communication environment in which various applications such as voice and data are mixed, relative priority control can be performed.

In addition, in the IEEE 802.11e standard, a continuous transmission scheme called TXOP (Transmission Opportunity) is defined. For describing this scheme, a communication scheme of IEEE 802.11 is described based on the following non-patent document 2.

[Non-patent document 2] ANSI/IEEE std 802.11, Wireless LAN medium access control (MAC) and physical layer (PHY) specifications, 1999

As shown in FIG. 1, this scheme uses a DCF (Distributed Coordination Function) scheme in which obtaining transmission opportunity (transmission right) based on backoff is necessary for transmission of each packet. In the figure, "D" indicates a packet sent from a node to another node, and "A" indicates an acknowledgement response (ACK, for example) in response to receiving a data packet. "DIFS" indicates a fixed period, determined in this standard, for which data packet transmission should be waited. "BO" indicates a variable period for which transmission is waited based on backoff, and the length of the period depends on a random number. As shown in the figure, when a communication node receives a data packet to be transferred, after waiting for a period defined by (DIFS+BO), the communication node sends one data packet. Also when the communication node receives a following data packet to be transferred, the communication node sends one data packet after waiting for the period defined by (DIFS+BO).

FIG. 2 is a diagram for explaining packet transmission using the continuous transmission scheme based on TXOP. In the diagram, "D", "A" and "BO" indicate the same as those described in FIG. 1. "AIFS" is similar to "DIFS" in a point that it indicates a fixed period during which data packet transmission should be waited, but "AIFS" has a length that is variable according to priority of packet. "AIFS" is defined in IEEE 802.11e that is a standard of wireless LAN QoS.

In the TXOP scheme, as to initial packet transmission, one data packet is transmitted after waiting for a period defined as (AIFS+BO) in the same way as the case shown in FIG. 1. However, for transmitting a following second packet, backoff control is not performed. After a response packet "A" is received from a destination communication node, one data packet is transmitted after waiting for a fixed period. The fixed period is called SIFS (Short Inter Frame Space). Similarly, for following packets after the second packet, a data packet is transmitted one by one after elapse of the period of SIFS after receiving a response packet. Accordingly, packet transmission following the initial packet transmission is performed continuously.

By using the TXOP scheme, since overhead time before packet transmission is decreased, efficiency of wireless bandwidth is improved so that capacity improvement can be expected. For example, a number of terminals that perform VoIP (Void over Internet Protocol) communications simultaneously can be improved, throughput of data communication can be improved, or the like. Also, for example, in a case where a payload to be sent is extremely shorter than backoff before starting transmission like voice data in the VoIP communication, efficiency improvement of communication based on the TXOP scheme can be largely expected. In addition, in a wireless LAN mesh network, increase of overhead may become a serious problem since same data is transferred a plurality of times by APs (access points or base stations). But, by using TXOP, it can be expected that the problem can be effectively decreased. In addition, since the number of times of backoff control based on the random number is decreased, the possibility of packet collision is decreased. As a result, improvement of capacity can be expected.

SUMMARY OF THE INVENTION

Problem to be Solved by the Present Invention

As mentioned above, by applying the TXOP scheme to the mesh network, improvement of network capacity can be expected due to overhead decrease and decrease of the number of times of backoff.

By the way, the continuous transmission by the TXOP scheme is performed when there are a plurality of packets in a transmission queue. When there is only one packet in the transmission queue, the packet is sent by a normal transmission scheme that is not the TXOP scheme.

FIG. 3 is a diagram for explaining a problem when TXOP is applied to a mesh network. In the case shown in FIG. 3, four VoIP terminals (V1, V2, V3 and V4) are performing voice packet communications via a mesh access point (MAP) that is a wireless communication apparatus. The mesh access point MAP transmits and receives packets with a mesh point MP. The mesh point MP may be a MAP to which a destination terminal of a packet belongs or may be a relay node though which the packet passes while it is sent to the destination terminal. The MAP includes an interface for a VoIP terminal and an interface for the inside of the mesh network. Generally, the latter interface can perform higher speed communication than the former interface.

In the example shown in the diagram, the first terminal V1 sends a voice packet to the MAP first. The MAP transfers the received packet to the MP. As mentioned above, the TXOP scheme is applied only when there are a plurality of transmission packets in a transmission queue. In this example, since there is only one voice packet that is from the first terminal V1 in the transmission queue of the MAP, the voice packet is transferred after a period of (AIFS+BO) elapses. Also, the fourth terminal V4 sends a voice packet to the MAP. Also in this case, in the similar reason, the voice packet is transferred after a period of (AIFS+BO) elapses.

In the example shown in the diagram, each of the third and the second terminals V3 and V2 sends one packet to the MAP at relatively adjacent timings, so that two voice packets are stored in the transmission queue. The packet to be transferred (packet received from the third terminal V3) first is transferred to the MP after the period (AIFS+BO) elapses. The next packet (packet received from the second terminal V2) is transferred after a predetermined period (SIFS) elapses after a response packet for the preceding packet is received. Since SIFS is set to be very short, FIG. 3 shows a situation as if the two packets are sent continuously. After that, in the same way, when the transmission queue stores only one packet, the MAP transfers the packet after a period (AIFS+BO) elapses. When a plurality of packets are stored, each packet after the first packet is continuously sent with the TXOP scheme using the described method.

Therefore, according to the conventional scheme, the TXOP scheme is not necessarily performed all the time. This is disadvantageous from the viewpoint for effectively utilizing wireless resources to increase network capacity. But, if the MAP always waits packet transmission until a plurality of packets are stored in the transmission queue, packet transmission delay may largely increase. Also, if every terminal sends voice packets one by one in a short period to the MAP so that the four packets are stored in the transmission queue, packet transfer according to the TXOP scheme can be performed most efficiently in terms of resources. However, it cannot be expected to always receive packets at such favorable timing.

It is desired to realize highly efficient TXOP for improving capacity even when a terminal that needs to periodically transmit packets like voice packets is connected to the mesh network.

The present invention is contrived for addressing at least one of the above-mentioned problems, and an object is to improve efficiency of communication between wireless communication apparatuses used in a wireless LAN system of the CSMA scheme.

Means for Solving the Problem

A wireless communication system complying with a CSMA scheme according to an embodiment of the present invention includes one or more wireless communication apparatuses and a communication terminal that performs communication via the one or more wireless communication apparatuses.

Each wireless communication apparatus includes:
a transmission buffer configured to store a packet and output the packet according to transmission timing;
a unit configured to determine a permissible delay time based on required quality for communication; and
a control unit configured to determine the transmission timing,
wherein, the control unit determines the transmission timing such that, after receiving a first packet, the wireless communication apparatus transmits the first packet after elapse of a waiting time that includes a period derived from a random number and the permissible delay time, and after receiving a response packet for the first packet, the wireless communication apparatus transmits a following second packet after elapse of a fixed period.

EFFECT OF THE INVENTION

According to the embodiment of the present invention, efficiency of communication between wireless communication apparatuses used in a wireless LAN system of the CSMA scheme can be improved.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, preferred embodiments of the present invention are described.

When a mesh access point (MAP) that is a wireless communication apparatus according to an embodiment of the present invention transfers a voice packet received from a VoIP terminal connected to the MAP to the inside of the mesh network, the MAP delays initial packet transmission timing by a time that is determined by the MAP independently (by each MAP in an autonomous decentralized manner) such that transmission of the TXOP scheme can be performed as much as possible. Accordingly, the number of times the efficient TXOP communication is performed increases in the mesh network. Thus, overhead can be decreased and the problem of packet collision can be solved, so that improvement of total capacity can be expected.

Each MAP may autonomously determine the time by which the transmission timing is delayed according to required delay by a user. Accordingly, improvement of total capacity can be expected without installing centralized control station.

The time by which the transmission timing is delayed can be changed according to a status of the network. For example, network delay may be periodically measured between MAPs to which VoIP terminals are connected or between a MAP to which the VoIP terminal is connected and a GW to which an external network is connected, so that the time may be adaptively determined within a range by which required condition of the user can be satisfied. The network delay can be measured using an existing routing protocol, for example. Accordingly, even though congestion degree of a network changes, highly efficient communication can be performed while keeping quality (including condition such as delay) required by the user.

According to an embodiment of the present invention, a highly efficient TXOP communication is realized in a wireless LAN mesh network. Thus, it becomes possible to improve total capacity represented by the number of VoIP terminals communicating at the same time and throughput of data communication.

Various effects of an embodiment of the present invention can be obtained by improving the mesh access point MAP as described below, and it is not essential to change a communication terminal. Thus, the embodiment of the present invention has a merit in that it can be easily applied to an existing system.

Figure 4:
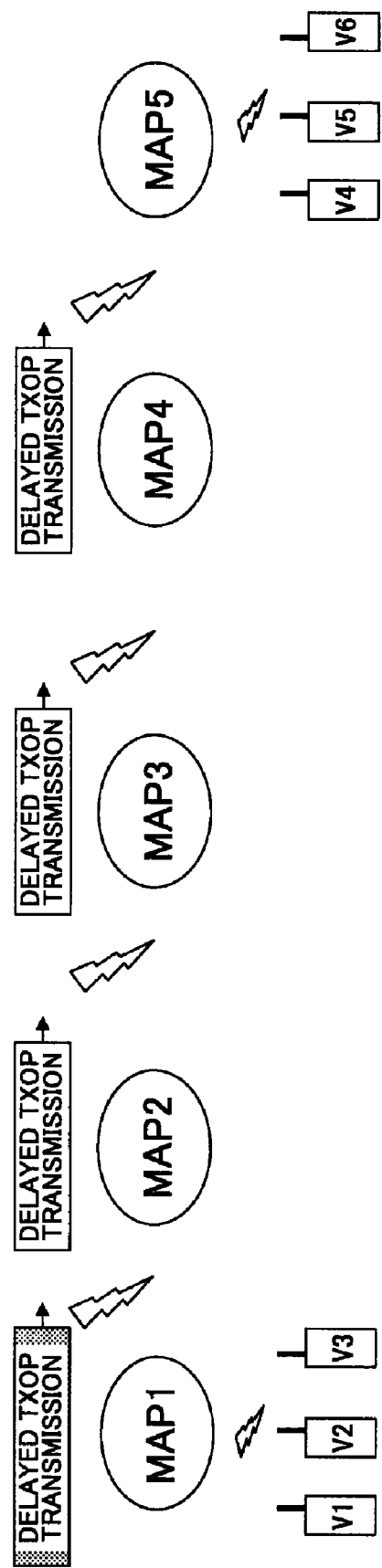
FIG. 4 is a diagram showing a wireless LAN system according to an embodiment of the present invention.

FIG. 4 shows a wireless LAN system adopting the CSMA scheme that can use the present invention. In this system, wireless LAN VoIP terminals (V1, V2, V3, V4, V5 and V6) perform voice packet communications via five mesh access points MAP 1-MAP 5. Each MAP includes a hardware configuration shown in FIG. 5. FIG. 6 shows a functional block diagram of the MAP.

The MAP includes a function for relaying packets from an adjacent MAP and a function as a wireless LAN base station for performing communication with a communication terminal under the MAP. Each of the MAPs includes a wireless LAN interface for connecting to the VoIP terminal (V1-V6) and a plurality of interfaces for communication among MAPs. The latter interface generally can perform communication at higher speed than the former interface. However, depending on circumstances, the interface for communication with a MAP and the interface for communication with the communication terminal may be the same.

As shown in FIG. 4, in this embodiment, wireless LAN VoIP terminals (V1, V2, V3, V4, V5 and V6) are performing voice packet communications. More particularly, a pair of V1 and V4, a pair of V2 and V5 and a pair of V3 and V6 are performing voice communications, in which terminals of each pair are connected to separated MAPs. In addition, a wireless link is established between MAP1 and MAP2, MAP2 and MAP 3, MAP3 and MAP4 and between MAP4 and MAP5.

Figure 5:
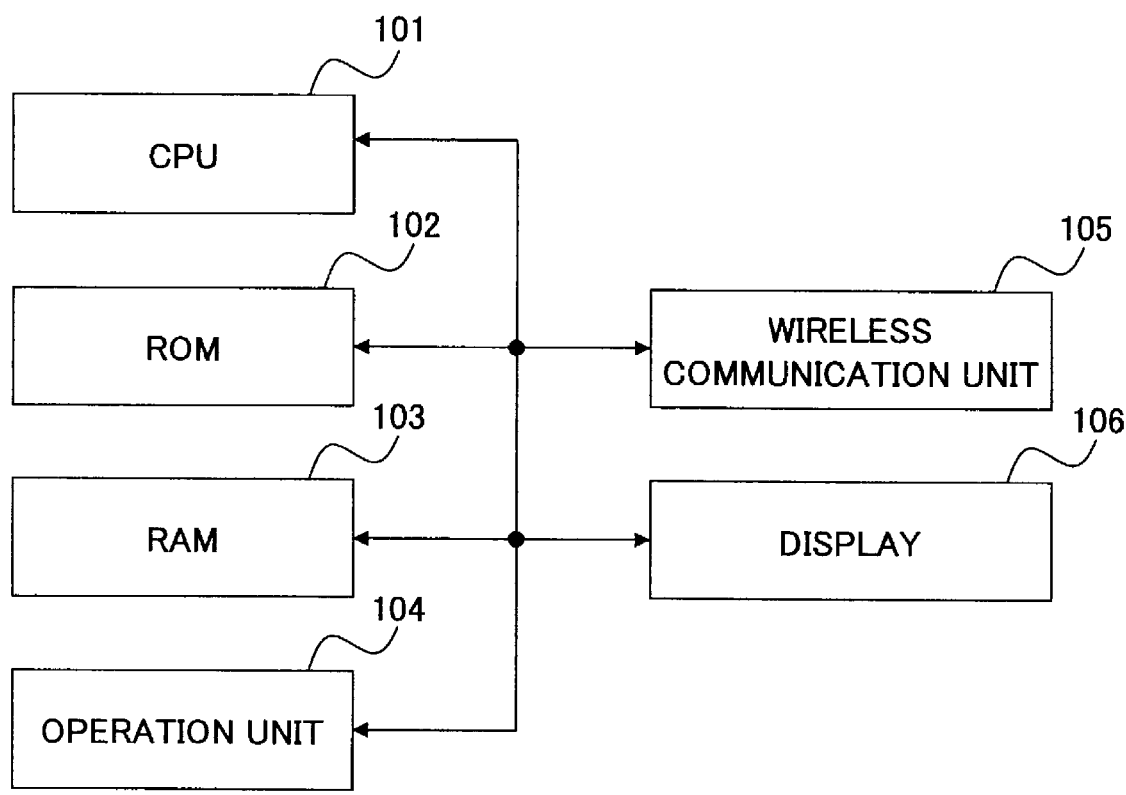
FIG. 5 is a hardware configuration diagram of a mesh access point (MAP)
Figure 6:
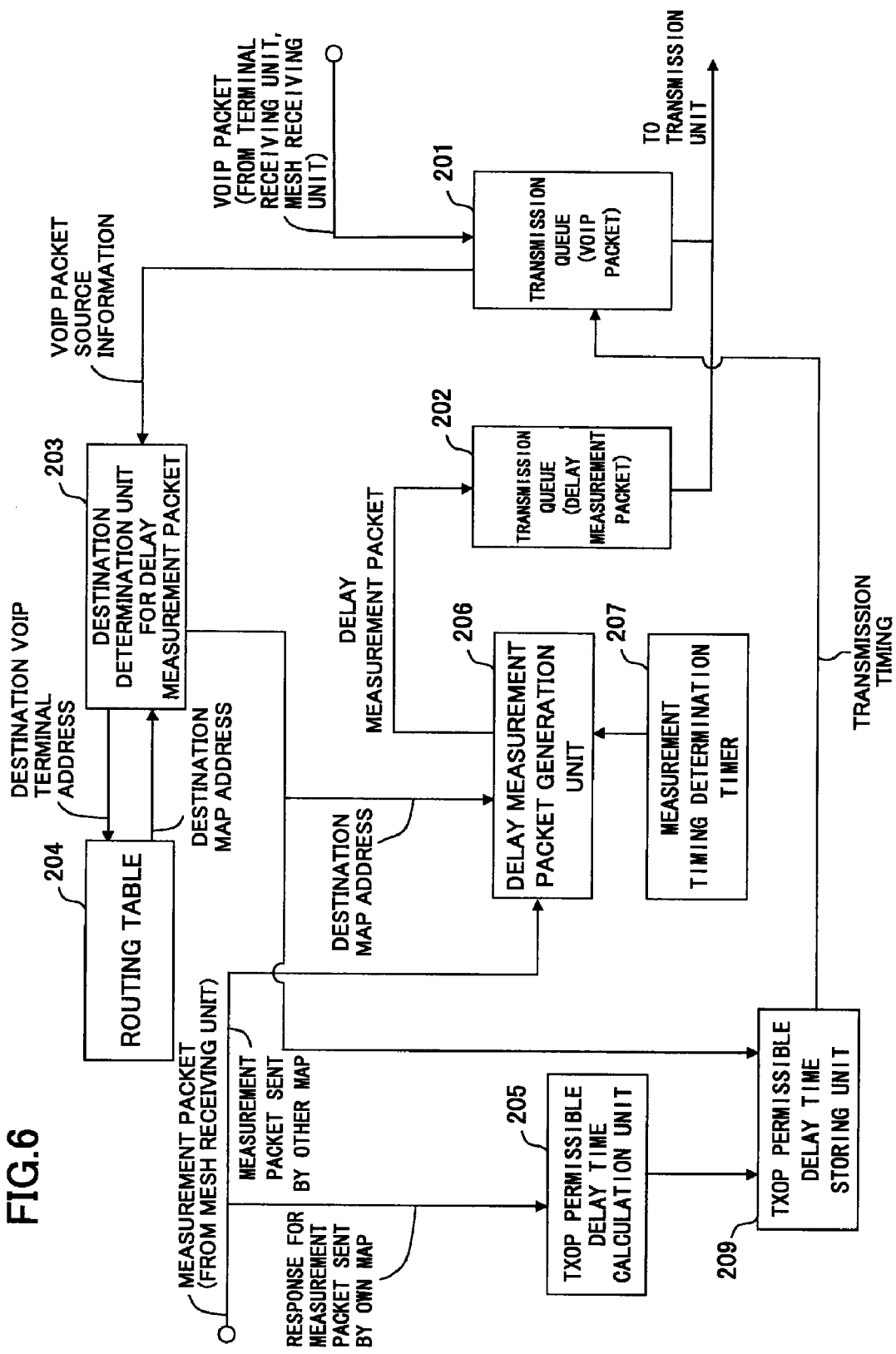
FIG. 6 is a functional block diagram of the mesh access point (MAP)

As shown in FIG. 5, the MAP may include a CPU 101 that is an information processing apparatus, memories such as a ROM 102 and a RAM 104, an operation unit 104 such as a key button, a wireless communication unit 105 that can perform wireless communication by the CSMA scheme, and a display 106. When the MAP is not provided with the operation unit 104 or the display 106, various settings may be made from a remote terminal via a network using a Web browser and the like. Alternatively, various settings may be made from a PC using TELNET and the like by connecting between the MAP and the PC by a serial cable.

FIG. 6 shows a functional block diagram of the mesh access point MAP. As shown in FIG. 6, the MAP includes transmission queues 201 and 202, a destination determination unit 203 for delay measurement packet, a routing table 204, a TXOP permissible delay time calculation unit 205, a delay measurement packet generation unit 206, a measurement timing determination timer and a TXOP permissible delay time storing unit 209.

The transmission queue 201 includes a function for queuing a voice packet received from a wireless LAN VoIP terminal connected to the MAP and queuing a relay voice packet received from an adjacent MAP. The transmission queue may be called a transmission buffer.

The transmission queue 202 is a transmission queue specific to transmitting a delay measurement packet used for an embodiment of the present invention. In this embodiment, although the transmission queues are separately prepared for voice packets and for delay measurement packets, a same transmission queue may be used for both of the packets. That is, a same transmission queue may be used for the voice packets and the measurement packets.

The destination determination unit 203 delay measurement packet obtains destination terminal information (MAC address) of a VoIP packet from the transmission queue 201 for determining a destination of the delay measurement packet. The destination of the delay measurement packet is a mesh access point to which a destination terminal of the VoIP packet belongs. The VoIP packet includes the MAC address of the destination terminal, but does not normally include information indicating which MAP the terminal belongs to. Therefore, the destination determination unit 203 for delay measurement packet refers to the routing table 204 to identify the MAC address of the MAP to which the destination terminal belongs.

The routing table 204 designates how to relay or transfer a packet that is received from the adjacent MAP or received from a terminal under the access point. Correspondence relationship of addresses described in the table may be properly updated.

When a response packet of a delay measurement packet that is already transmitted is returned from a destination MAP, the TXOP permissible delay time calculation unit 205 determines a TXOP permissible delay time from an actual packet transmission delay (difference between measurement packet transmitting time and measurement response packet receiving time) and a required delay time set by a user and the like. The time that can be actually measured is a round trip time that is two times as large as one-way delay time. The required delay time is set by a user or an application or the like such that packet transmission from a source MAP to a destination MAP is completed within the required delay time. Therefore, the required delay time may be called a target value. More particularly, for example, the TXOP permissible delay time is set such that TXOP permissible delay time< (required delay time set by a user)−(round trip time/2) is satisfied. Accordingly, transmission of TXOP scheme can be performed while satisfying the delay time requirement required by a user.

The TXOP transmission time storing unit 209 stores the calculated TXOP delay time for a predetermined period. The period during which it is stored may be changed arbitrarily by a user.

Whether the TXOP permissible delay time is calculated or not (whether transmission of TXOP scheme is performed or not) may be determined depending on the source of a received packet. For example, when a MAP transmits a packet received from a terminal under the MAP, the TXOP permissible delay time may be calculated, and when the MAP relays a packet received from a MAP of a former stage to a MAP of a following stage, the TXOP permissible delay time may not be calculated.

In addition, the TXOP permissible delay time may be determined by dividing the one-way delay time measured using the measurement packet by a number of relay times to the destination MAP.

The delay measurement packet generation unit 206 generates a packet for measuring packet transmission delay between a source MAP and a destination MAP. The delay measurement packet includes at least a field for recording time when transmission is performed.

When delay measurement is performed depending on time, the measurement timing determination timer 207 provides trigger for generating the delay measurement packet. For example, delay measurement may be performed periodically, or may be performed at a particular time. The measurement timing determination timer 207 manages such time.

By the way, a delay measurement packet that is generated in another MAP and is received by the own MAP is sent to the delay measurement packet generation unit 206 in the own MAP from a mesh receiving unit (not shown in the diagram), and is transmitted as a delay response packet. Accordingly, the another MAP can properly receive the delay measurement packet.

Figure 7:
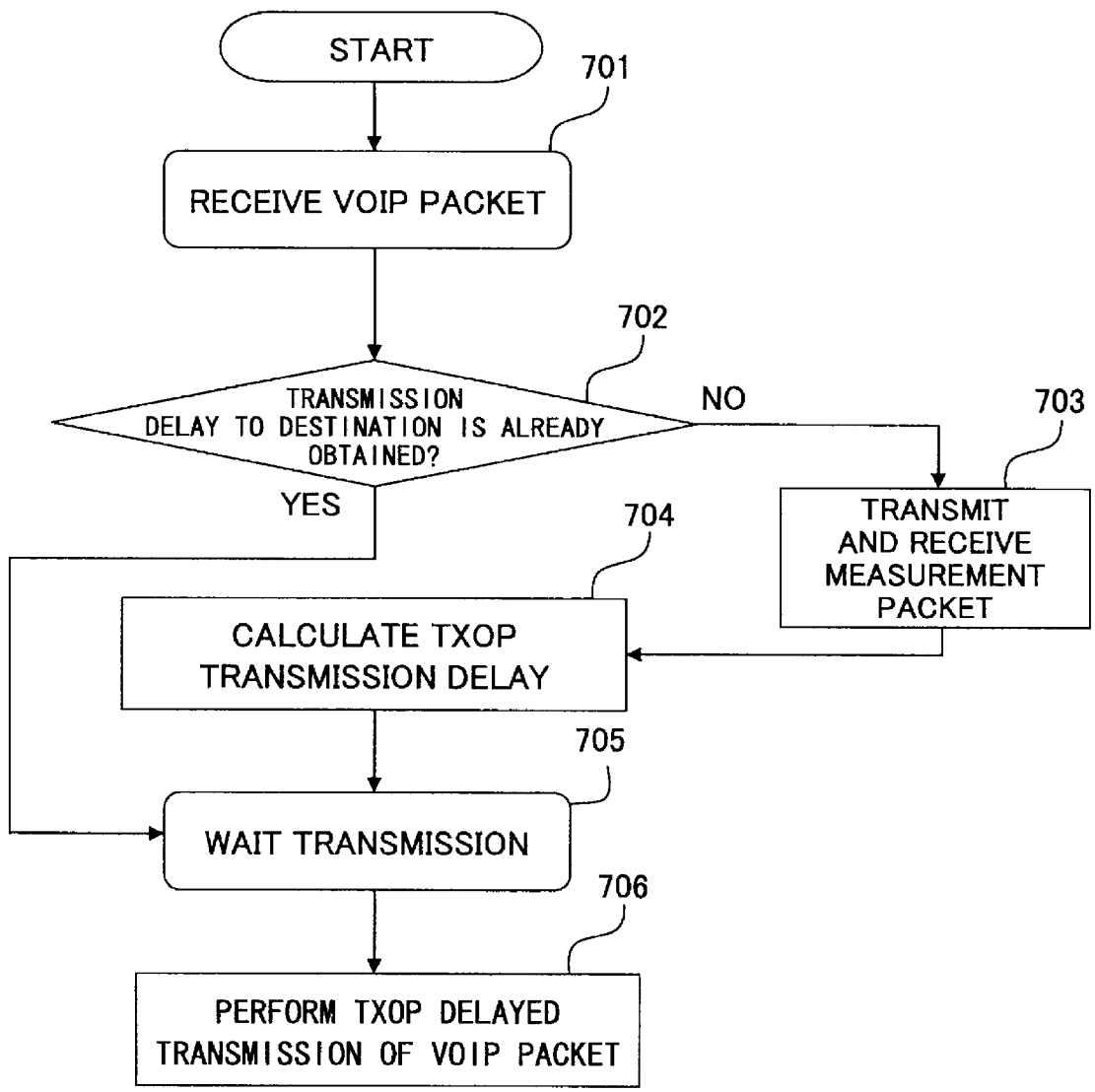
FIG. 7 is a flowchart showing an example of operation according to an embodiment of the present invention.

FIG. 7 is a flowchart showing an example of operation of the MAP according to an embodiment of the present invention.

In step 701, the MAP receives a VoIP packet from a terminal under the MAP or from an adjacent MAP.

In step 702, it is determined whether the TXOP permissible delay time for a MAP (destination MAP) to which a destination terminal is connected is already calculated. This determination can be calculated by referring to the TXOP permissible delay time storing unit 209 in FIG. 6. When the TXOP permissible delay time is already calculated, the process goes to step 705, and when it is not yet calculated, the process goes to step 703.

In step 703, the MAP generates a delay measurement packet, and the packet is transmitted to the destination MAP so that the packet is received as a response packet by the own MAP.

In step 704, the TXOP permissible delay time is calculated based on the received delay measurement packet.

In step 705, transmission is waited for the TXOP permissible delay time that was prepared before or that is prepared just now.

In step 706, like a normal transmission of the TXOP scheme, a packet to be transmitted first is transmitted after waiting for (AIFS+BO). Each packet after the first packet is transmitted after a short fixed time such as SIFS elapses after receiving a response packet.

In the flowchart of FIG. 7, the TXOP permissible delay time may be obtained by dividing time obtained by delay measurement by the number of hops of each MAP so that each MAP may add transmission delay. But, the present invention is not limited to that embodiment. For example, as shown in FIG. 4, TXOP permissible delay transmission may not be performed as to relay packets received from an adjacent MAP, instead, normal TXOP transmission may be performed for the packets.

Figure 8:
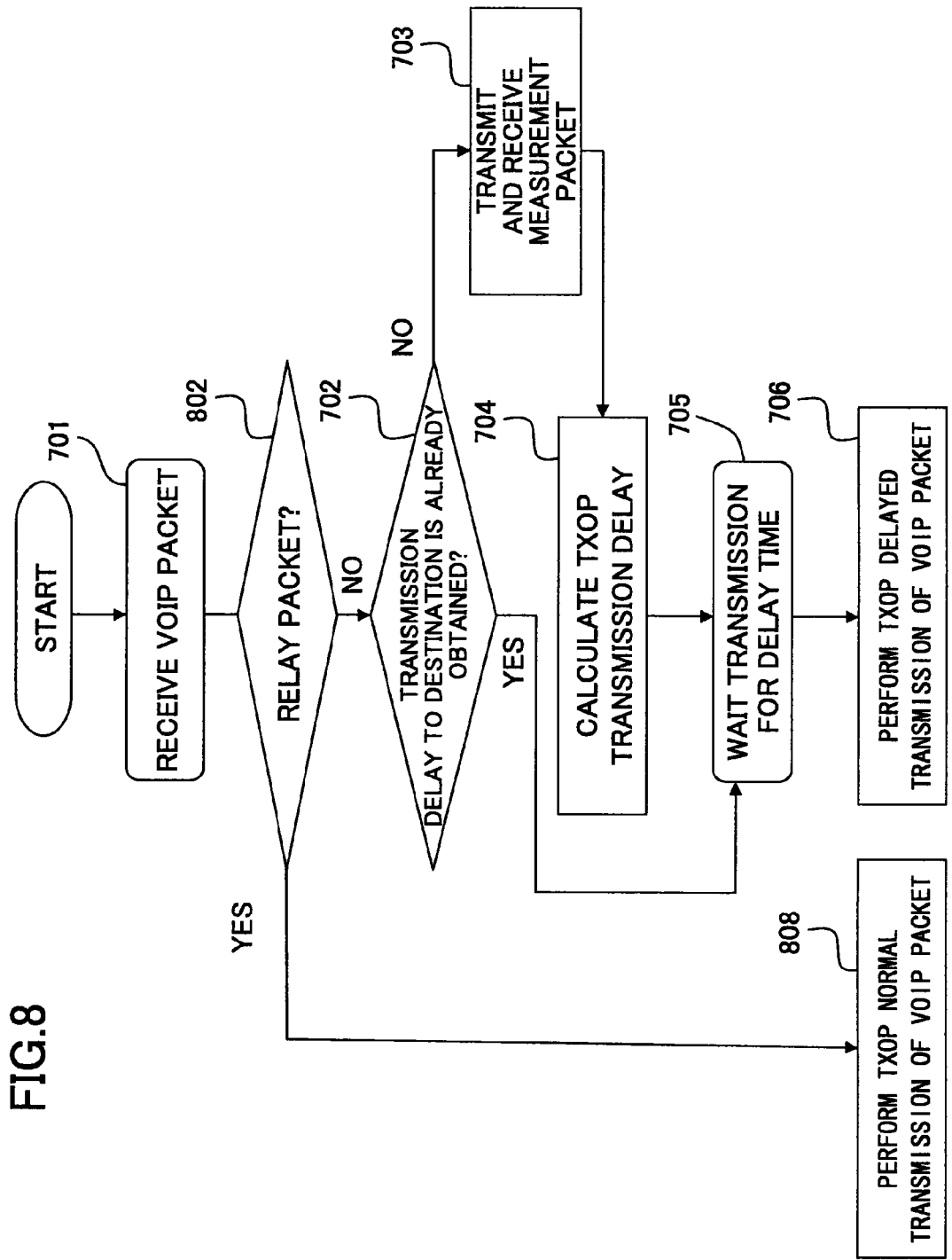
FIG. 8 is a flowchart showing a modified example of the case shown in FIG. 7.

FIG. 8 shows a flowchart showing this case. As shown in the diagram, a determination step 802 is added between the steps 701 and 704. In the determination step 802, it is determined whether the packet received by the MAP is a relay packet from the adjacent MAP or a packet from a terminal under the MAP. If the packet is one received from the adjacent MAP, VoIP packet communication is performed according to conventional TXOP. If not, operation described above is performed.

Figure 9:
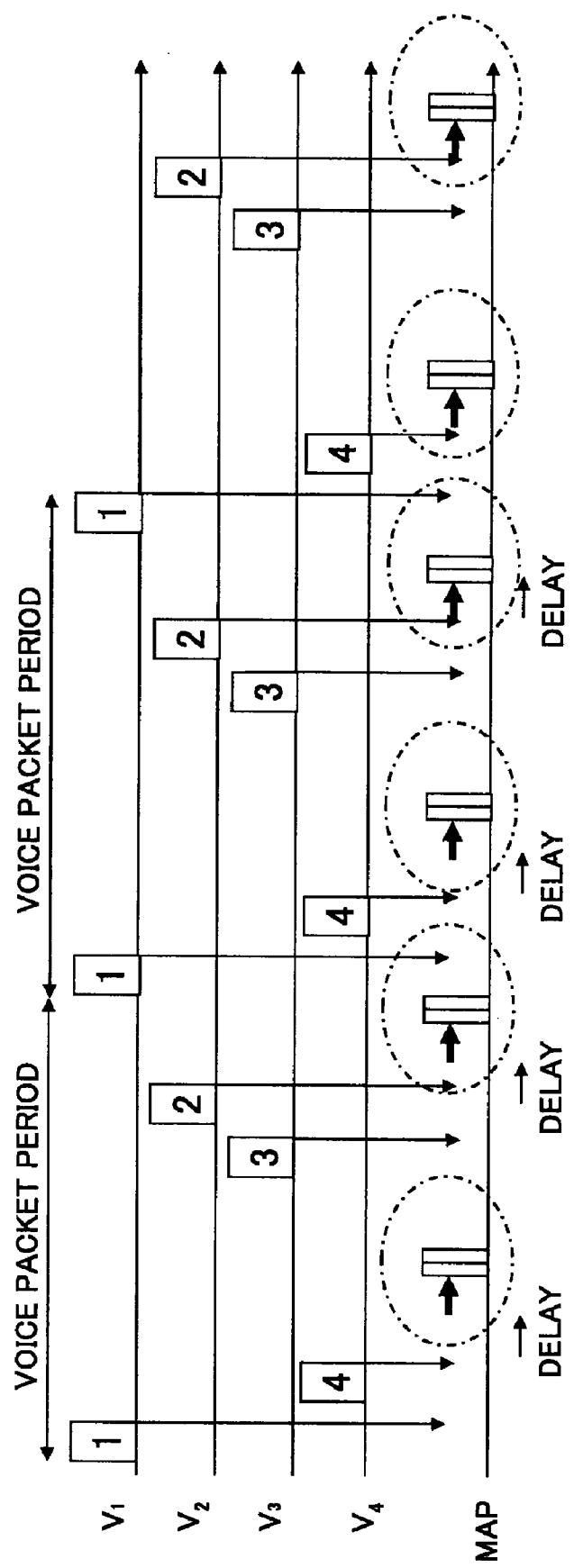
FIG. 9 is a flowchart showing an example of operation according to an embodiment of the present invention.

FIG. 9 shows an example of a sequence that can be realized in the present embodiment. In the present embodiment, TXOP transmission that is more efficient compared with FIG. 3 can be realized when the TXOP scheme is applied to a link between MAPs. Also in the example shown in FIG. 9, four VoIP terminals (V1, V2, V3, V4) are performing voice packet communications via mesh access points (MAPs).

In the example shown in the figure, the first terminal V1 sends a voice packet to a MAP first. The MAP stores the received packet into a transmission queue, and waits for elapse of the TXOP permissible delay time. In the example shown in the figure, the MAP receives a voice packet from the fourth terminal V4 and stores it in the transmission queue before the elapse of the TXOP permissible delay time. When the TXOP permissible delay time elapses, the MAP transfers a first voice packet that is waiting in the transmission queue to an adjacent MAP (subsequent MAP) after elapse of the period (AIFS+BO). A next packet (the packet received from the fourth terminal V4) is transferred after elapse of a predetermined period (SIFS) after receiving a response packet of the preceding packet. Accordingly, two packets are transmitted almost continuously by the TXOP scheme.

Figure 1:
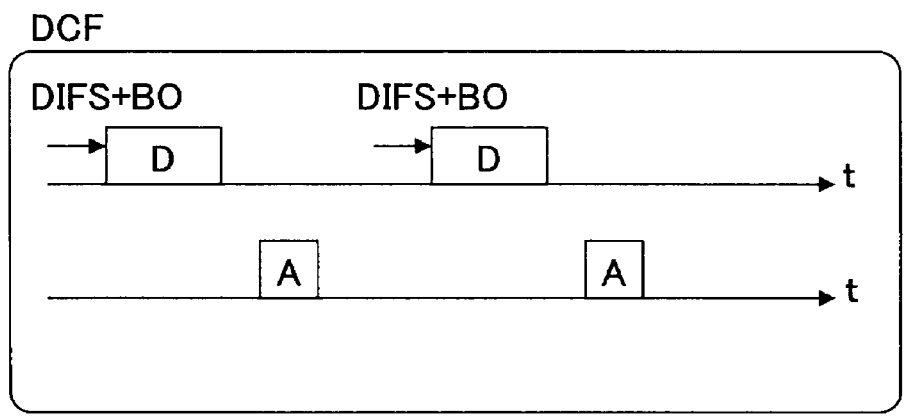
FIG. 1 is a diagram for explaining a packet transmission scheme defined in IEEE 802.11.
Figure 2:
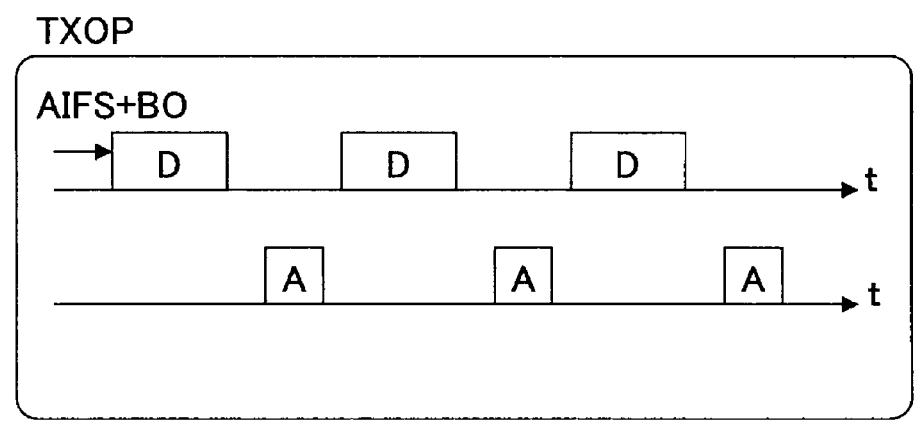
FIG. 2 is a diagram for explaining a TXOP scheme defined in IEEE 802.11e.
Figure 3:
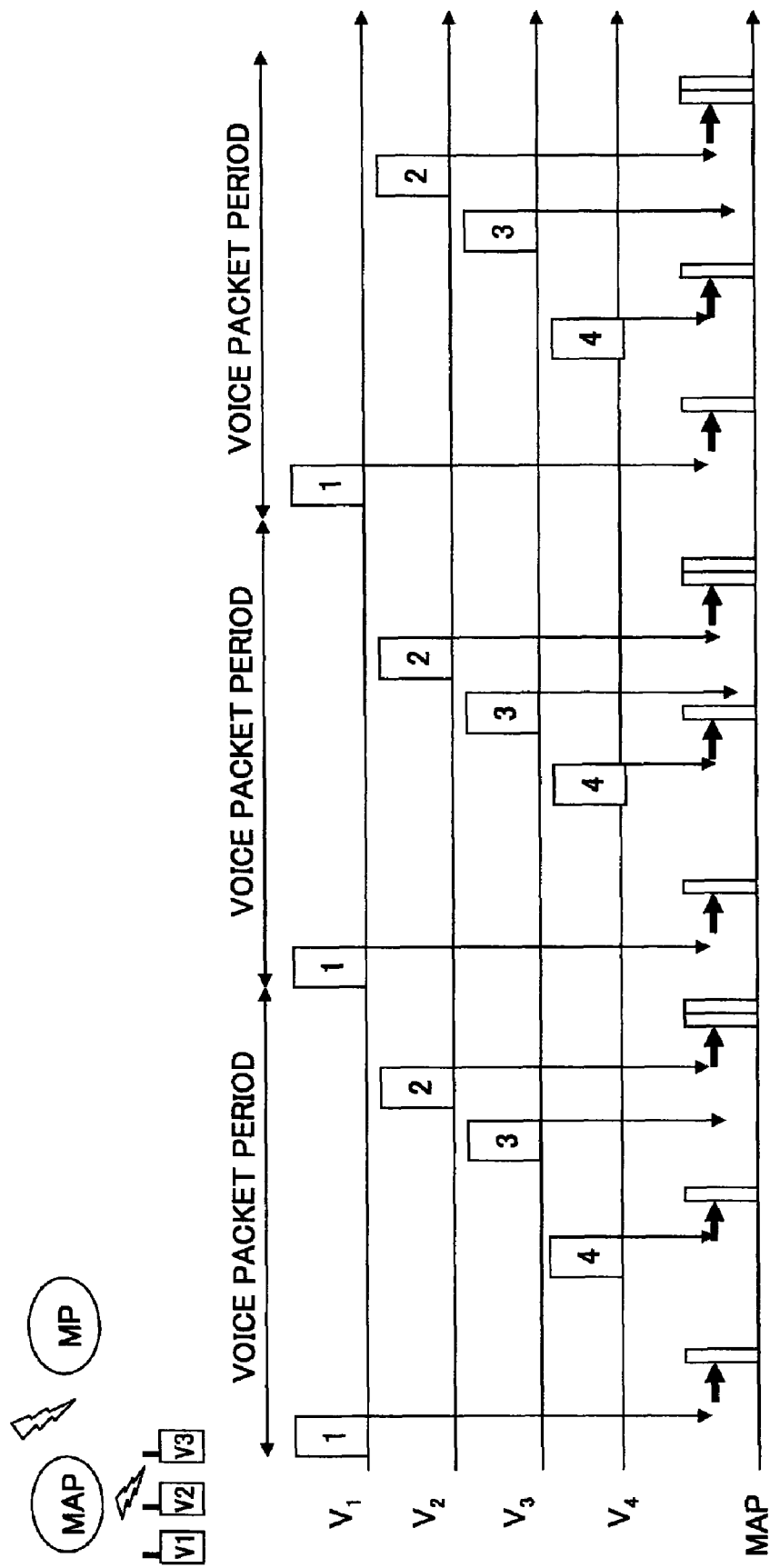
FIG. 3 is a diagram for explaining a problem when the TXOP scheme is applied to a mesh network.

In the same way as the example shown in FIG. 3, each of the third and the second terminals V3 and V2 sends one packet to the MAP at relatively adjacent timings, so that two voice packets are stored in the transmission queue. The packet to be transferred (packet received from the third terminal V3) first is transferred to the MP after the period (AIFS+BO) elapses. The next packet (packet received from the second terminal V2) is transferred after a predetermined period (SIFS) elapses after a response packet for the preceding packet is received. After that, in the same way, when the transmission queue stores only one packet, the MAP waits for elapse of the period of (AIFS+BO) after the TXOP permissible delay time τ elapses. Then, the MAP transfers the packet stored in the transmission queue.

In this method, since transmission of the packet is waited for a period longer than the case of FIG. 3 by the TXOP permissible delay time, the probability in that the transmission queue stores a plurality of packets increases by that. When a plurality of packets are stored in the transmission queue, packet transmission based on the TXOP scheme can be used. After the MAP receives a packet, if only one packet is still stored in the transmission queue after the elapse of the period (τ+AIFS+BO), the voice packet is transmitted as normal. According to the present embodiment, packet transmission timing is delayed (up to the limit depending on circumstances) such that packet transmission based on the TXOP scheme is performed as much as possible while ensuring required communication quality. Accordingly, more benefits due to the TXOP scheme can be obtained compared with conventional methods.

Figure 10:
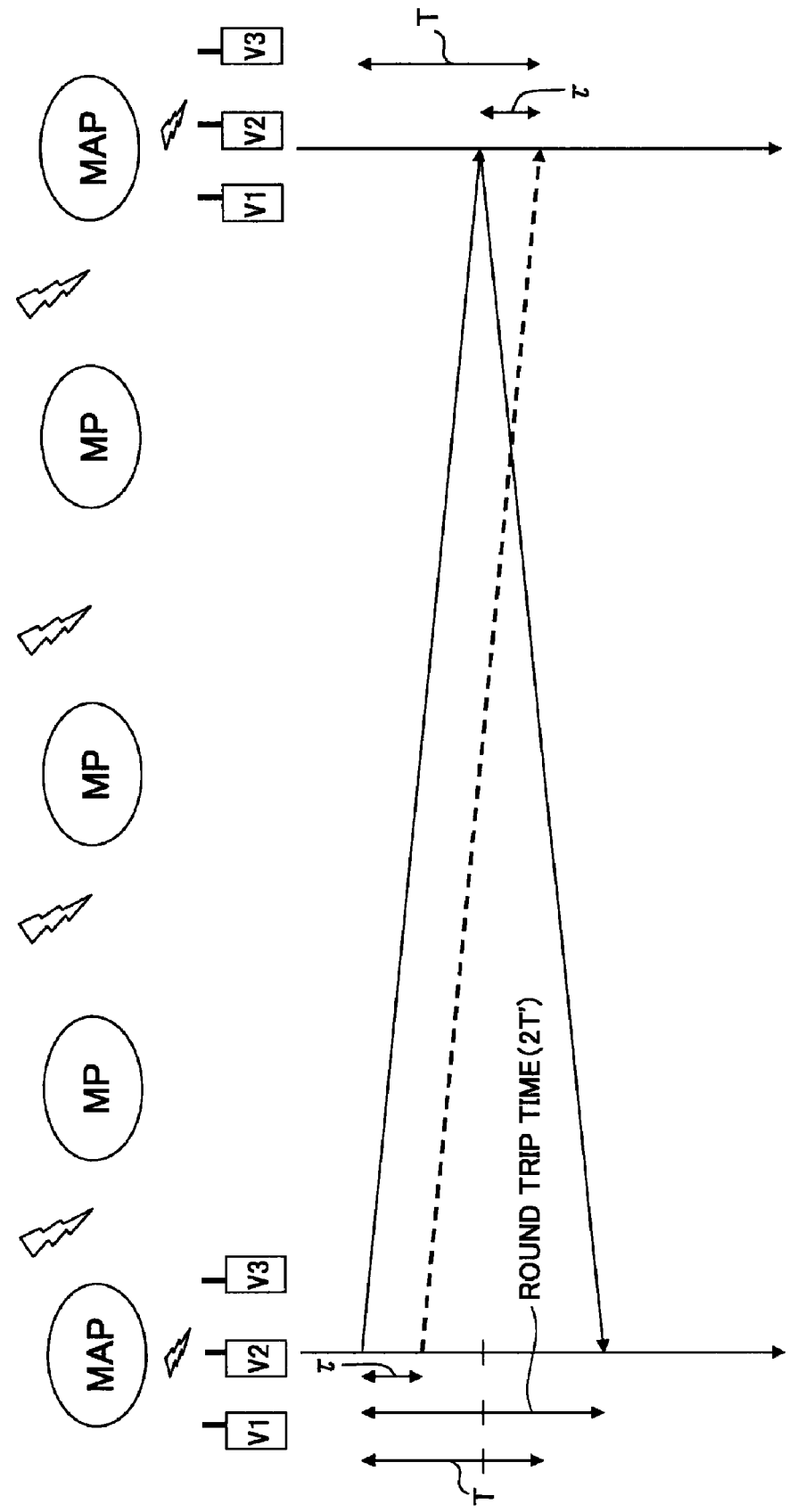
FIG. 10 is a diagram for explaining sending and receiving of delay measurement packets according to an embodiment of the present invention.

FIG. 10 is a diagram for explaining transmitting and receiving of the measurement packet in the present embodiment. By transmitting and receiving the measurement packet between MAPs, it becomes possible to obtain the roundtrip delay time, the number of relay times and the like. In the diagram, "TXOP permissible delay" corresponds to the TXOP permissible delay time, "required delay for call quality" corresponds to "required delay time set by a user", and "measurement value" corresponds to "roundtrip time/2".

By the way, as the measurement packet, a signal of the IP layer may be used. As the signal, ICMP Echo Request/Reply (Ping) that is generally used for measuring a delay time in an IP network may be used. Also, as the measurement packet, a route request packet used for a routing protocol may be used. In addition, a newly defined packet also can be used. As another scheme, a VoIP packet can be used for a delay time measurement packet by writing transmission time information into the VoIP packet. By writing time information into the VoIP packet, more particularly, by writing time at which the packet is transmitted from the MAP into a header and the like, it becomes unnecessary to prepare a new frame, other than the voice packet, for measurement.

By the way, in the flowchart, although a delay time to the destination MAP in the mesh network is used as a parameter for determining the TXOP permissible delay time, the TXOP permissible delay time may be determined according to a number of connecting terminals alternatively or additionally. For example, when the number of terminals connected to the MAP is small, the effect of decrease of bandwidth consumption is small even though the TXOP permissible delay time is set. Thus, there is a risk in that a delay time simply increases. When the number of connecting terminals is large, the effect of applying the TXOP delay is large. From this viewpoint, for example, it is desirable to set the TXOP permissible delay time to be long when the number of the connecting terminals is large, and to set the TXOP permissible delay time to be short when the number of the connecting terminals is small.

In addition, a number of times of relaying to a destination MAP, a number of MAPs forming the mesh network, or the like can be used as a parameter for determining the TXOP permissible delay time. For example, when the number of times of relaying to the destination MAP is small or when the number of MAPs forming the mesh network is small, there is a possibility in that the effect of decrease of bandwidth is small, so that it becomes unprofitable to perform the TXOP delay transmission. According to this viewpoint, it is desirable to set the TXOP permissible delay time to be long when the number of times of relaying to the destination MAP is large and/or when the number of MAPs in the mesh network is large, and to set the TXOP permissible delay time to be short when the number of times of relaying to the destination MAP is not large and/or when the number of MAPs in the mesh network is not large.

In addition, as a parameter for determining the TXOP delay time, wireless bandwidth usage rate information (load information) included in a beacon packet that is periodically reported from an adjacent node may be used. Also, a number of terminals (STA_Count information) connected under the MAP may be used. In these cases, for example, when load of the adjacent node is high, more particularly, when it is determined that a wireless bandwidth usage rate of the adjacent node is high, the possibility that transmission opportunity can be obtained by backoff is low, and there is high possibility that collision of packets occurs. Thus, it is desirable to increase the TXOP permissible delay. In addition, also in the case when STA_Count information indicates a large value, since the possibility that transmission opportunity can be obtained by backoff is low and there is high possibility that collision of packets occurs, it is desirable to increase the TXOP permissible delay. When the TXOP permissible delay time is set to be long, more packets are easily stored in the transmission queue. Therefore, when transmission opportunity is obtained once, many packets can be transmitted continuously so that resources can be utilized efficiently.

Figure 11:
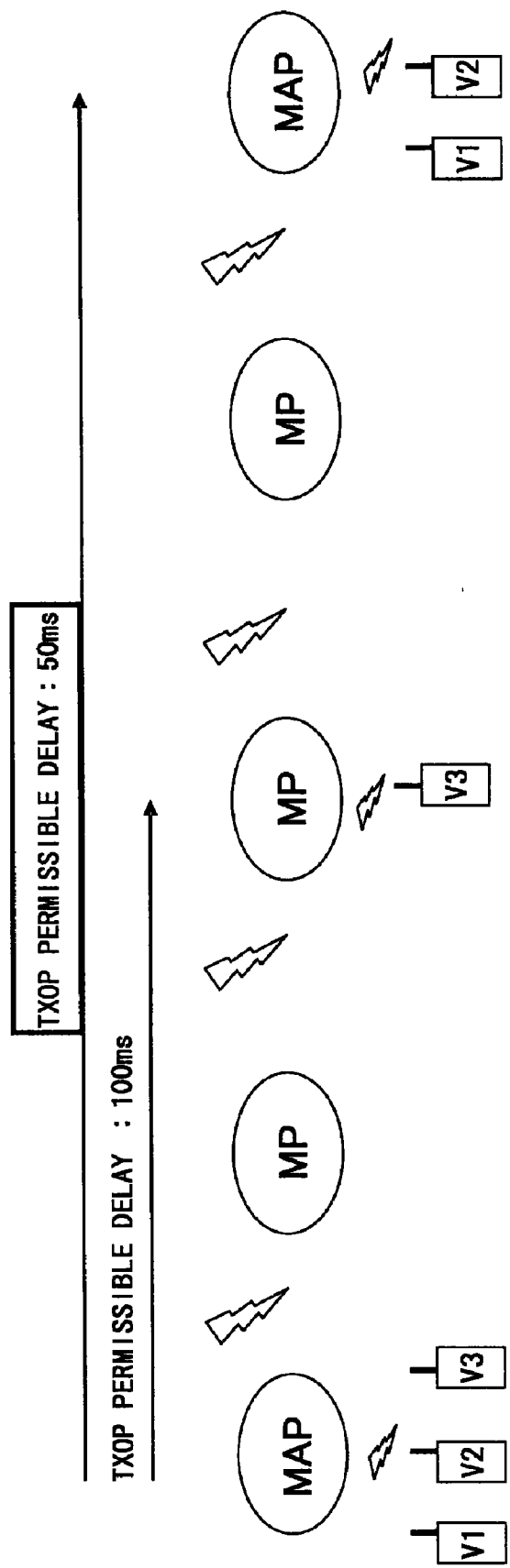
FIG. 11 shows a situation in which there are a plurality of destination MAPs.

Although one TXOP permissible delay time is derived in the above-mentioned embodiments, there may be a case where a plurality of TXOP permissible delay times are derived. For example, as shown in FIG. 11, when there are a plurality of destination MAPs, a plurality of TXOP permissible delay times are derived. In the example shown in the diagram, voice communication is performed between V1 and V1, between V2 and V2, and between V3 and V3. For example, assuming that a TXOP permissible delay time such as 50 ms is derived between V1 and V1 and between V2 and V2, and that a TXOP permissible delay time such as 100 ms is derived between V3 and V3. In such a case, if a larger TXOP permissible delay time is used, there is a risk in that "required delay time" between V1 and V1 or between V2 and V2 is not satisfied. Therefore, in the case shown in FIG. 11, it is preferable that shorter TXOP permissible delay time is used.

The present invention is not limited to the specifically disclosed embodiments, and variations and modifications may be made without departing from the scope of the present invention.

The present application contains subject matter related to Japanese patent application No. 2006-217290, filed in the JPO on Aug. 9, 2006, the entire contents of which are incorporated herein by reference.

What is claimed is:

1. A wireless communication system complying with a CSMA scheme, comprising:
   one or more wireless communication apparatuses; and
   a communication terminal that performs communication via the one or more wireless communication apparatuses,
   each wireless communication apparatus comprising:
   a transmission buffer configured to store a packet and output the packet according to transmission timing;
   a unit configured to determine a permissible delay time based on required quality for communication; and
   a control unit configured to determine the transmission timing,
   wherein, the control unit determines the transmission timing such that, after receiving a first packet, the wireless communication apparatus transmits the first packet after elapse of a waiting time that includes a period derived from a random number and the permissible delay time, and after receiving a response packet for the first packet, the wireless communication apparatus transmits a following second packet after elapse of a fixed period.

2. A wireless communication apparatus used in a wireless communication system complying with a CSMA scheme, comprising:
a transmission buffer configured to store a packet and output the packet according to transmission timing;
a unit configured to determine a permissible delay time based on required quality for communication; and
a control unit configured to determine the transmission timing,
wherein, the control unit determines the transmission timing such that, after receiving a first packet, the wireless communication apparatus transmits the first packet after elapse of a waiting time that includes a period derived from a random number and the permissible delay time, and after receiving a response packet for the first packet, the wireless communication apparatus transmits a following second packet after elapse of a fixed period.

3. The wireless communication apparatus as claimed in claim 2, wherein the wireless communication apparatus calculates the permissible delay time based on a measurement value of packet transmission delay between a source wireless communication apparatus and a destination wireless communication apparatus.

4. The wireless communication apparatus as claimed in claim 2, wherein the wireless communication apparatus determines the permissible delay time based on a number of wireless communication apparatuses between a source wireless communication apparatus and a destination wireless communication apparatus.

5. The wireless communication apparatus as claimed in claim 2, wherein the wireless communication apparatus determines the permissible delay time based on a usage rate of wireless bandwidth.

6. The wireless communication apparatus as claimed in claim 2, wherein the wireless communication apparatus determines the permissible delay time based on a number of communication terminals connected to the wireless communication apparatus.

7. The wireless communication apparatus as claimed in claim 2, wherein the first packet is received from a communication terminal connected to the wireless communication apparatus.

8. The wireless communication apparatus as claimed in claim 2, wherein, when destination wireless communication apparatuses of the first and second packets are different, the wireless communication apparatus calculates the waiting time using a shorter one of permissible delay times calculated for the destination wireless communication apparatuses.

9. The wireless communication apparatus as claimed in claim 2, wherein, the packet to be stored in the transmission buffer is received with a predetermined period.

10. A communication method used in a wireless communication apparatus complying with a CSMA scheme, comprising the steps of:
receiving a packet from a communication terminal, and storing the packet into a transmission buffer;
determining a permissible delay time based on required quality for communication; and
outputting the packet based on transmission timing,
wherein, the transmission timing is determined such that, after receiving a first packet, the wireless communication apparatus transmits the first packet after elapse of a waiting time that includes a period derived from a random number and the permissible delay time, and after receiving a response packet for the first packet, the wireless communication apparatus transmits a following second packet after elapse of a fixed period.

* * * * *